United States Patent
Unterforsthuber et al.

(10) Patent No.: US 6,547,278 B2
(45) Date of Patent: *Apr. 15, 2003

(54) GAS GENERATOR FOR A SAFETY ARRANGEMENT

(75) Inventors: Karl Unterforsthuber, Oberhaching (DE); Karl-Heinz Sommer, Stockdorf (DE); Ingrid Hofbauer, München (DE); Georg Schönhuber, Oberneukirchen (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/834,497

(22) Filed: Apr. 13, 2001

(65) Prior Publication Data

US 2001/0020778 A1 Sep. 13, 2001

Related U.S. Application Data

(63) Continuation-in-part of application No. 09/171,252, filed as application No. PCT/EP98/01310 on Mar. 6, 1998, now Pat. No. 6,250,673.

(30) Foreign Application Priority Data

Mar. 8, 1997 (DE) .......................... 197 09 597

(51) Int. Cl.[7] .............................................. B60R 21/26
(52) U.S. Cl. .......................... 280/741; 280/736
(58) Field of Search ................... 280/741, 736, 280/740, 742; 102/530, 531

(56) References Cited

U.S. PATENT DOCUMENTS

| 3,972,545 A | 8/1976 | Kirchoff et al. ............ 280/736 |
| 4,530,516 A | 7/1985 | Adams et al. |
| 4,578,247 A | 3/1986 | Bolieau ...................... 102/531 |
| 4,943,086 A | 7/1990 | Cunningham ............... 280/741 |
| 4,981,655 A | 1/1991 | Kolbe et al. ................. 102/530 |
| 5,582,427 A | 12/1996 | Rink et al. .................... 280/740 |
| 5,585,597 A | 12/1996 | Faigle et al. |
| 5,611,566 A | 3/1997 | Simon et al. ............... 280/736 |
| 5,882,036 A | 3/1999 | Moore et al. ............... 280/736 |
| 6,189,925 B1 * | 2/2001 | Reichtalhammer et al. . 280/736 |
| 6,213,501 B1 * | 4/2001 | Hock ......................... 280/736 |

FOREIGN PATENT DOCUMENTS

| DE | 2518460 | 10/1975 |
| DE | 4019677 | 6/1990 |
| DE | 9006600 | 10/1990 |
| DE | 4012893 | 10/1991 |
| DE | 4208844 | 9/1993 |
| DE | 4227547 | 2/1994 |
| EP | 0365739 | 5/1990 |
| EP | 0672562 | 9/1995 |

* cited by examiner

Primary Examiner—Paul N. Dickson
Assistant Examiner—Ruth Ilan
(74) Attorney, Agent, or Firm—Tarolli, Sundheim, Covell, Tummino & Szabo L.L.P.

(57) ABSTRACT

A gas generator for a vehicle occupant restraint system has a combustion chamber delimited by a combustion chamber wall and filled with propellant granules. A structure is arranged in the combustion chamber for holding down the propellant granule, which has a disc-shaped holding face with grid holes, wherein the holding face is pressed into the combustion chamber and is connected in a form- and force-fitting manner with the combustion chamber wall. The structure for holding down the propellant granules is prestressed and presses elastically onto the propellant granules thereby arresting the propellant granules at a preselected filling level and at a variable distance from the combustion chamber cover.

6 Claims, 5 Drawing Sheets

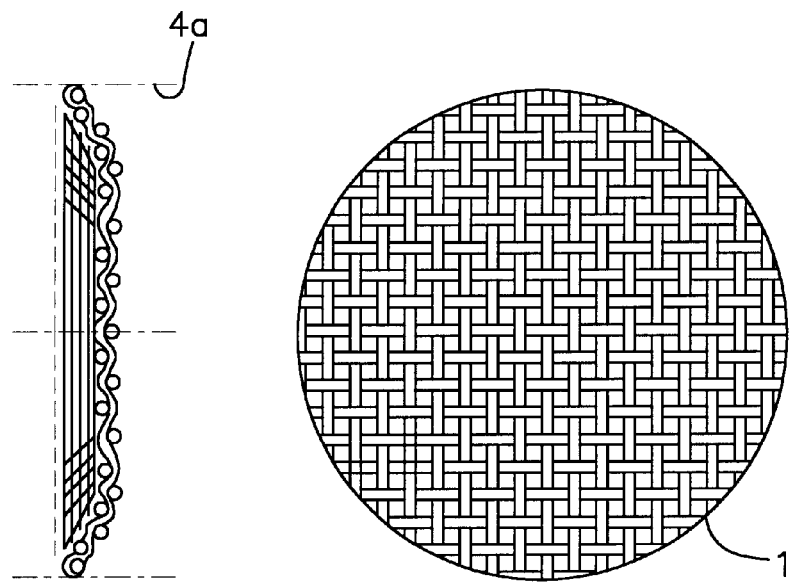
Fig.3b
Fig.3a
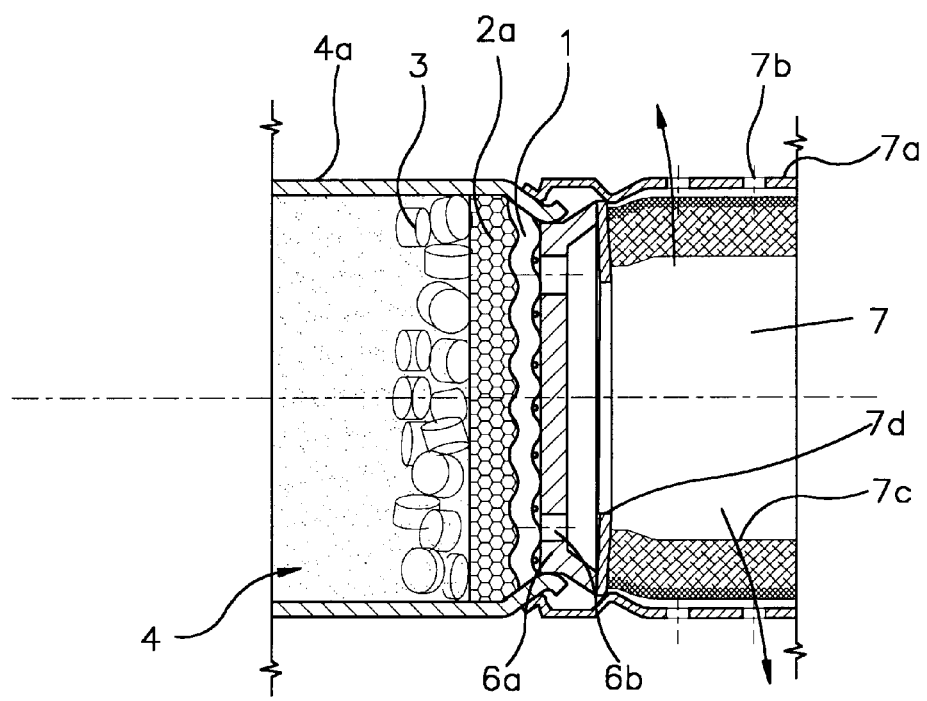
Fig.4

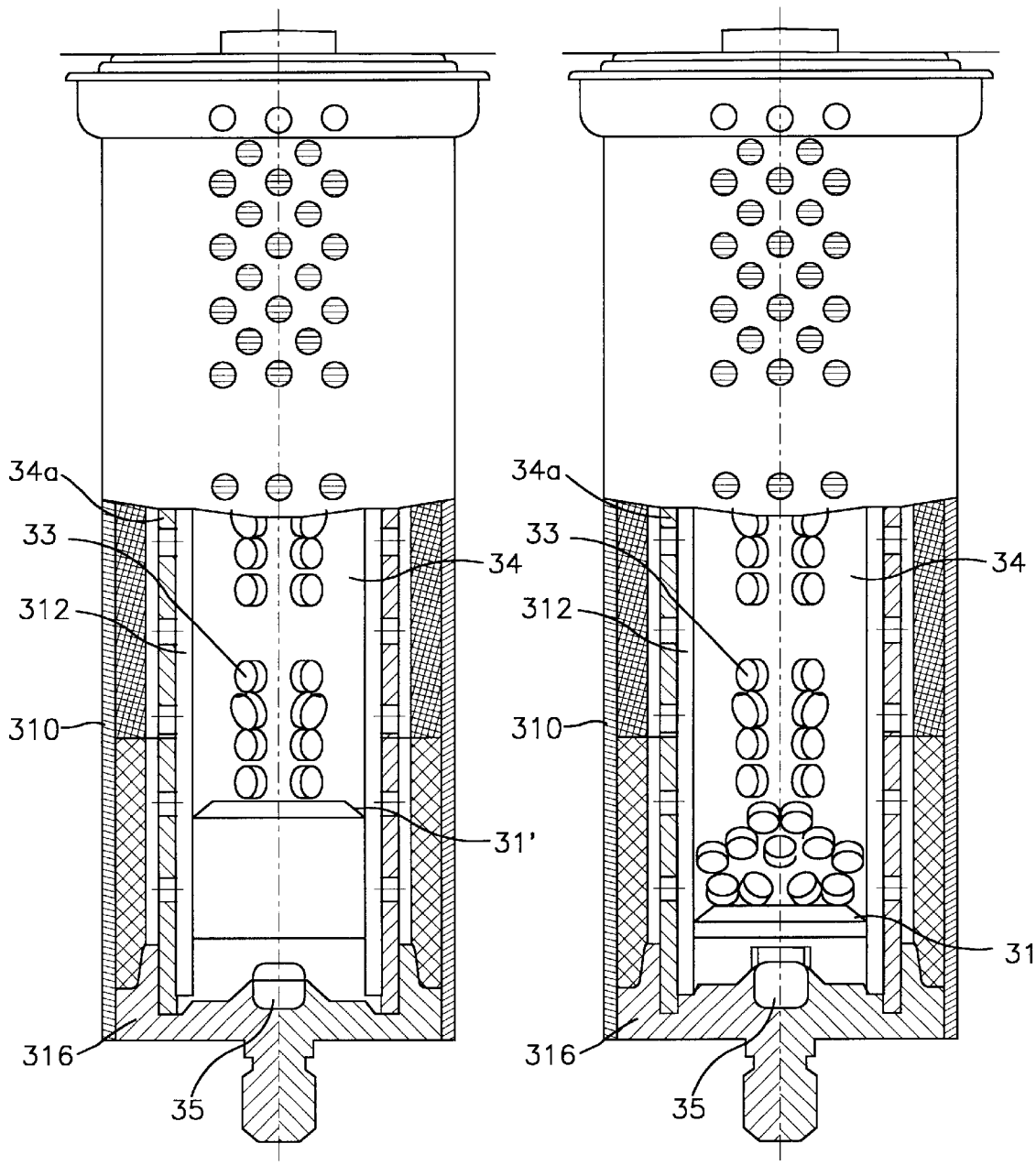

GAS GENERATOR FOR A SAFETY ARRANGEMENT

This application is a CIP of U.S. Ser. No. 09/171,252 filed Oct. 15, 1998 now U.S. Pat. No. 6,250,673 which is a 371 of PCT/EP98/01310 filed Mar. 6, 1998.

The invention relates to a gas generator for a safety arrangement with a means for holding down propellant granule in a combustion chamber. A preferred field of application are gas generators for motor vehicle safety arrangements such as belt tensioners, airbags, roll bars or current supply cutoff units, which are filled with a corresponding propellant granule, preferably in tablet form, for the production of a defined gas volume in the case of activation.

BACKGROUND OF THE INVENTION

Gas generators are to be used increasingly universally for various applications, e.g. in the driver's or passenger's airbag, in which differing gas volumes are made available with differing speed. The propellant granule is used for this in differing concentration, quantity and chemical composition. Fluctuations in the filling level, however, may cause relative movements of the propellant granule in the combustion chamber, a non-uniform distribution of the granule, and material abrasion on the propellant granule. Thereby, the required ignition- and pressure propagation is impaired. For these reasons, an arresting of the propellant granule is necessary. In addition, through an arresting, rattling noises of the granulate in the combustion chamber can be avoided.

As can be seen from the DE 42 27 547 A1, to balance out the filling level and to avoid relative movements, a filling body, designated in the publication as volume equalizing means, is used. This filling body, generally of elastic material, occupies the empty volume of greater or lesser size which is present in most cases and balances out fluctuations in level. The known filling body can, however, only balance out the filling level well within particular limits. In the case of greater level differences, the size or quantity of the filling body must be adapted accordingly. This increases the material costs, but in particular also the manufacturing expenditure, because means for recognizing the filling level and dosing the filling become necessary.

Furthermore, the use of filling bodies for arresting propellant granule in combustion chambers also proves to be unsuitable because in the case of combustion of the propellant, the chemical and physical characteristics and also the flow-dynamic characteristics at the outlet openings of the produced gas mixture are affected in a negative manner.

It is therefore an object of the invention to provide gas generators with a means for holding down propellant granule in a combustion chamber, in particular of gas generators for motor vehicle safety arrangements, which means limits the space for the propellant granule irrespective of the required filling level, and reliably arrests it.

SUMMARY OF THE INVENTION

The present invention provides a gas generator for a safety arrangement, in particular for a vehicle occupant restraint system, comprising:

a combustion chamber delimited by a combustion chamber wall and at least one combustion chamber cover;

propellant granule filled into the combustion chamber to a preselected filling level, and a means arranged in the combustion chamber for holding down the propellant granule;

wherein the means for holding down the propellant granule comprises a disc-shaped holding face, the holding face being pressed into the combustion chamber and connected in a form- and force-fitting manner with the combustion chamber wall, and being pre-stressed for pressing elastically onto the propellant granule, thereby arresting the propellant granule at the preselected filling level and in a variable distance from the combustion chamber cover; and wherein the holding face has grid holes having a diameter smaller than the propellant granule.

The holding face is to be understood here as a flat or corrugated structure, provided with holes, preferably a metallic fabric or a perforated metal sheet, the maximum grid hole diameter of which is smaller than the propellant granule, in order to ensure the arresting of the propellant granule in accordance with the invention. By means of the mesh width of such a grid or the number and size of the holes, in addition the outflow of the combustion gas into the empty space of the combustion chamber can be controlled and pre-filtered. The holding face is constructed such that a form- and force fitting connection to the combustion chamber wall is produced.

For the production of a form- and force-fitting connection between the holding face and the combustion chamber wall, various known solutions are available, such as for example a corresponding press-fit supported by a chamfering of the holding face edge or by spring rings. The arresting of the propellant granule takes place independently of the filling level by pressing in the disc-shaped holding face into the combustion chamber, the force and speed of pressing in being selected such that the propellant granule is pushed together accordingly and arrested, but a destruction of the propellant granule or abrasion is largely avoided. In addition, the holding face can be used for filtering the outflowing gas in order to avoid an outflow of combustion residues.

An advantageous further development of the invention consists in that through corresponding dimensioning of the form- and force-fitting connection and of the holding face in relation to the type of material and to the sum of the hole areas, the release of the arresting means is made possible on exceeding a predetermined threshold pressure. Thereby, undesirably high pressure peaks which arise through non-uniform deflagration or faulty propellant granule, can be intercepted.

DESCRIPTION OF THE DRAWINGS

The invention is explained in further detail in embodiments with the aid of the drawings, in which:

FIGS. 3a and 3b show a grid-shaped holding face according to the invention, for a tubular gas generator and with a chamfered outer edge, FIG. 4 shows a tubular gas generator with a grid-shaped holding face according to the invention, after the permissible pressure threshold value has been exceeded, FIGS. 6a and 6b show a tubular gas generator according to a further embodiment of the invention.

FIG. 7b is a view of a part shown in FIG. 7a.

DESCRIPTION OF PREFERRED EMBODIMENTS

Figure 1:
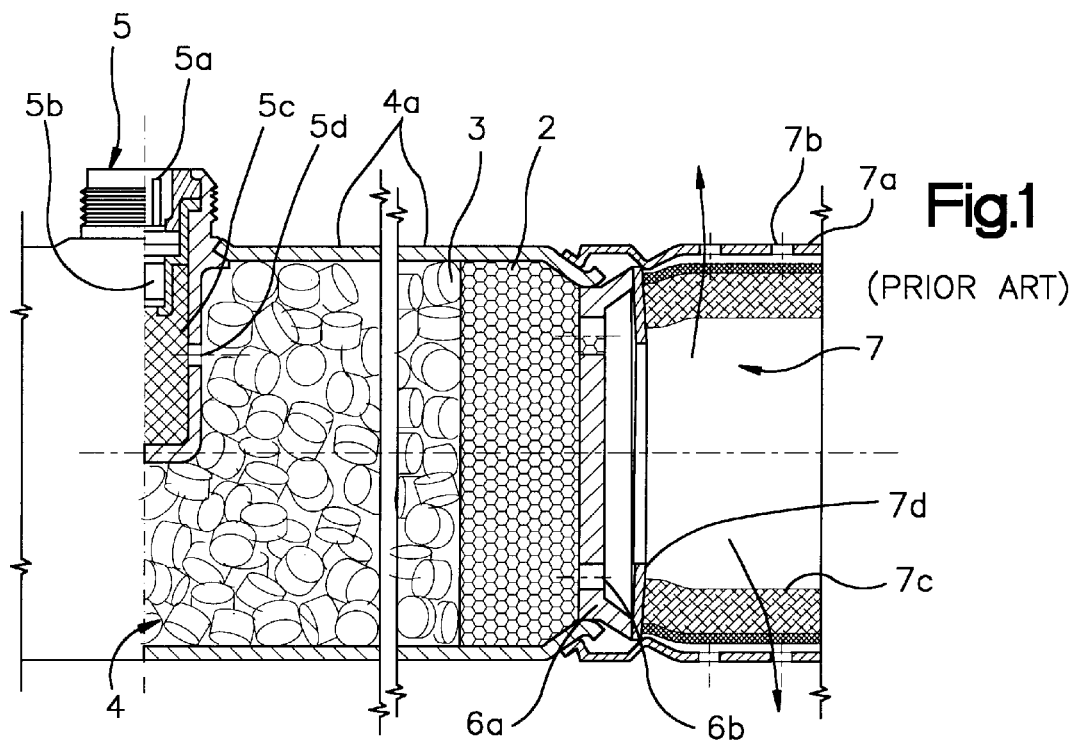
FIG. 1 shows a tubular gas generator according to the prior art, with conventional filling body.

FIG. 1 shows an embodiment of a tubular gas generator in accordance with the DE 42 27 547 A1. Like all gas generators, this embodiment comprises an ignition device 5, a combustion chamber 4 and a combustion chamber cover or overflow part 6a with outflow openings 6b. Usually a propellant 3 in granulate form is present in the combustion chamber 4. FIG. 1 additionally shows inside the ignition device 5: electrical connections 5a, a primary charge 5b, a secondary charge 5c and an ignition opening 5d in the housing 5e of the ignition device 5. The gas occurring on deflagration of the propellant 3 can escape via the outflow openings 6b into the filter chamber 7, with a corresponding pressure existing in the combustion chamber 4. The filter chamber 7 is surrounded by a filter tube 7a with outflow openings 7b and a filter 7c, which is arrested by an annular metal sheet 7d. The propellant granule is held down by means of a filling body 2.

Figure 2:
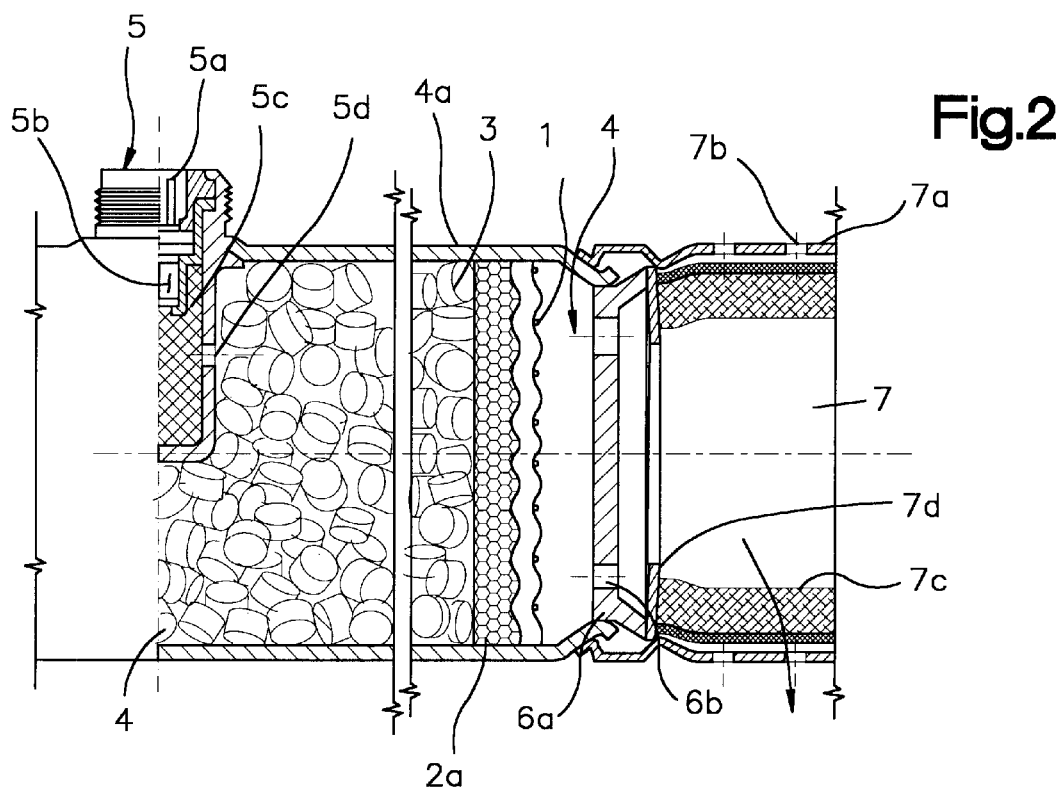
FIG. 2 shows a tube gas generator with a grid-shaped holding face, according to the invention, for arresting.

The gas generator shown in FIG. 2 corresponds in its construction to the gas generator according to the prior art shown in FIG. 1, with the exception of the alterations in accordance with the invention. According to the invention, the propellant granule 3 is arrested in the combustion chamber 4 by the disc-shaped holding face 1 which is provided with grid holes, with a corresponding form- and force-fitting connection existing between the outer edges of the grid-shaped holding face 1 and the combustion chamber wall 4a. In the embodiment as shown, the holding face 1 is spaced apart from the cover 6a thereby defining an empty space 8 free of propellant granule 3. The holding face 1 presses elastically and with a prestressing onto the propellant granule. This enables the propellant granule 3 to be arrested in a variable distance from the combustion chamber cover 6a. Relative movements of the propellant granule 3 inside the combustion chamber 4 are thereby prevented, independently of the filling level. Thereby, abrasion and rattling noises are avoided and through the defined position of the propellant granule 3, a desired ignition- and pressure propagation is ensured. This leads to do away with the filling body, to a simpler manufacture without special filling level measuring means and to the gas generator and the manufacturing installation being able to be used for various quantities of propellant granule and concentrations, as is necessary in the field of airbags. The gas can escape into the filter chamber 7 via the empty space 8 and the outflow openings 6b in the cover or overflow part 6a. The filter chamber 7 is surrounded by a filter tube 7a with outflow openings 7b and by a filter 7c which is arrested by an annular metal sheet 7d. The ignition device 5 can likewise be seen in FIG. 2 with its components: electrical connections 5a, primary charge 5b, secondary charge 5c and ignition opening 5d.

The additional use of a thin layer of elastic filler 2a upstream of the holding face 1 is possible for damping.

FIG. 3a shows a holding face 1 according to the invention, provided with grid holes and suitable for the tubular gas generator illustrated in FIG. 2. The holding face 1 according to FIG. 3 is constructed as a wire fabric which is constructed so as to be chamfered, i.e. bent to have an angled profile, and sharp-edged at the rim for better arresting on the combustion chamber wall. The size, material, type of weave and the tolerances are selected according to the size of the propellant granule and the desired threshold pressure. If the pressure rises within this threshold value, the opening areas of the grid are sufficient to ensure a pressure equalization within the entire combustion chamber.

FIG. 4 shows a tubular gas generator according to FIG. 1, in which the holding face 1, owing to an exceeding of the pressure threshold value, has been pressed against the end of the combustion chamber and thus the pressure peak has been reduced accordingly.

Figure 5:
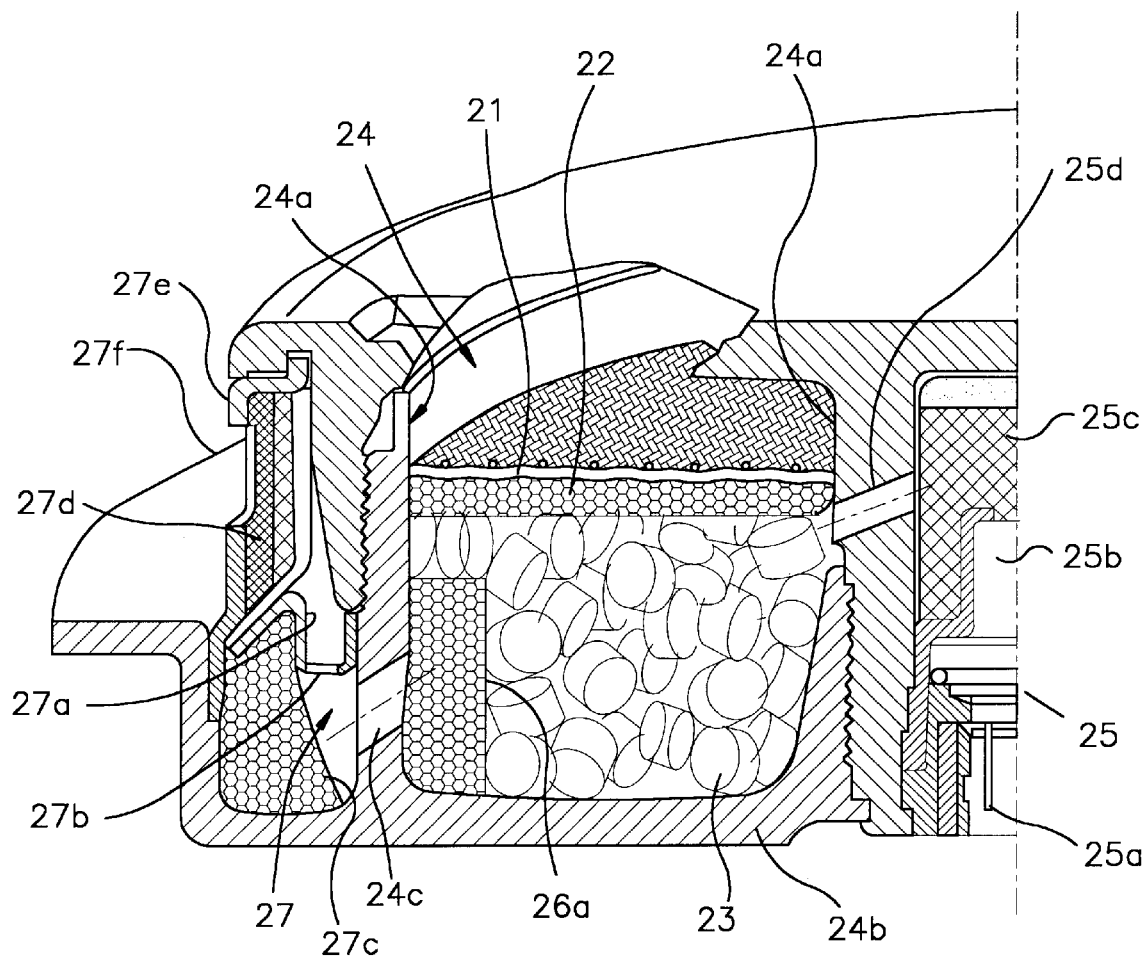
FIG. 5 shows a partial section through a ring gas generator with a grid-shaped holding face as a hollow ring disc corresponding to the hollow cylindrical combustion chamber.

FIG. 5 now shows a partial section through a ring gas generator in which the holding face 21 is constructed as a hollow ring disc, corresponding to the hollow cylindrical combustion chamber 24. The holding face 21 located above filter 22 is arranged here not upstream of the overflow region, consisting of an overflow filter 26a and an overflow opening 24c in the combustion chamber base 24b, but rather in the upper region of the combustion chamber 24 lying opposite the ignition device 25, in order to also show this option. The ignition device 25 is likewise illustrated in FIG. 5 with its components: electrical connections 25a, primary charge 25b, secondary charge 25c and ignition opening 25d. The combustion chamber 24 is formed by a combustion chamber cover 24a and a combustion chamber base 24b screwed therewith, which has lateral overflow openings 24c leading to the filter chamber 27. The filter 27c is arranged in the filter chamber 27 upstream of a deflector plate 27a which in turn has outflow openings 27b. The pre-filtered gas flows through these to a fine filter 27d, held by an outer plate 27e, and then through the outlet opening 27f. An empty space free of propellant granules 23 is defined between the folding face 21 and the combustion chamber cover 24a.

The gas generator shown in FIG. 6 has a tubular outer housing 310 with a combustion chamber 34 formed therein. The combustion chamber 34 is filled with propellant granule 33 in tablet form. The combustion chamber 34 is delimited by a combustion chamber wall 34a, on the inner face of which longitudinal ribs 312 are formed, extending in axial direction. Between the longitudinal ribs a strip-shaped filter 314 is arranged. An ignition device 35 is integrated into a cover 316 closing the combustion chamber 34 and projects into the combustion chamber 34.

In the embodiment shown here, the holding face 31 consists of a perforated metal sheet with grid holes 318, the diameter of which is smaller than the diameter of the propellant granule 33 and of the propellant tablets (FIG. 7a), respectively. In the embodiment shown here, the holding face has two opposed straight edges 320 which engage the longitudinal ribs 312 and thus produce the form- and force-fitting connection. In the region of the straight edges 320, the holding face 31 is additionally angled, preferably at an angle of approximately 30 degrees, whereby the spreading of the edges 320 into the longitudinal ribs 312 is further favored. For stiffening, the holding face 31 can be additionally provided with crimped portions 322, preferably in the form of an arc of a circle, which extend substantially transversely to the straight edges.

After the filling of the combustion chamber 34 with the propellant granule 33, the holding face 31 is pressed into the combustion chamber 34. Here, it is under prestressing and presses elastically onto the propellant granule 33. An empty space 38 is defined between the cover 316 and the holding face 31. In this way, a simple filling of the gas generator with propellant granule is made possible without costly measurement of the filling height, and at the same time rattling noises by loose propellant granule 33 are avoided, as it is possible to arrest the propellant granule 33 in a variable distance from the cover 316. For tubular gas generators with reduced power, a reduced quantity of propellant granule 33 can be used without costly changes to the manufacturing process. The position of the holding face in a gas generator with reduced power is likewise illustrated in FIG. 6*b* and is designated by the reference number 31'. Between the holding face 31 and the propellant granule 33 in addition a filling body of elastic material (not shown here) can be arranged.

Figure 7A:
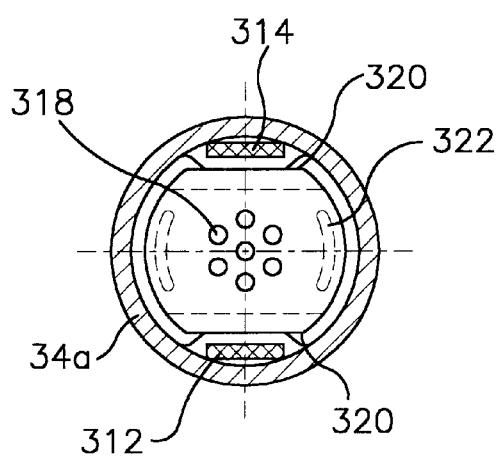
FIG. 7a shows a cross-section through the tubular gas generator according to FIG. 6.
Figure 7B:
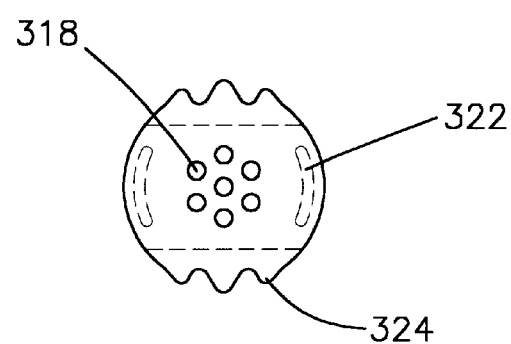

As an alternative to the embodiment illustrated in FIG. 7*a*, the holding face 31 can also be provided on its edge with bulges 324 (FIG. 7*b*) which exert a punctiform stress on the combustion chamber wall and thus bring about the form- and force-fitting connection. In this case, the straight edges and also the longitudinal ribs on the combustion chamber wall can be eliminated.

Generally, a structural adaptation of the grid-shaped holding face to the shape and dimensions of the combustion chamber, the use of various arresting possibilities and also the adaptation of the grid material, the type and width of the grid for the actual case of application is possible at any time. Also the use of spring sheets with a correspondingly high number of holes is conceivable. Thereby, a prestressing of the grid-shaped holding face can be achieved, which acts in an elastic manner on the propellant granule and thus ensures an equalization of filling volume contractions during the lifespan of the product. In addition, the arresting forces and the threshold pressure value can be set precisely.

What is claimed is:

1. A gas generator for a safety arrangement, comprising:
   a combustion chamber delimited by a combustion chamber wall and at least one combustion chamber cover, one of said combustion chamber wall and said combustion chamber cover having openings for directing flow of gas;
   propellant granule filled into the combustion chamber to a pre-selected filling level in a range of filling levels, and
   a means arranged in the combustion chamber for holding down the propellant granule in said entire range of filling levels;
   wherein the means for holding down the propellant granule comprises a disc-shaped holding face, the holding face being pressed into the combustion chamber and connected in a form- and force-fitting manner with the combustion chamber wall, and being pre-stressed for pressing elastically onto the propellant granule, thereby arresting the propellant granule at the pre-selected filling level in said entire range of filling levels and at a variable distance from the combustion chamber cover which variable distance depends upon said pre-selected filling level in said range of filling levels;
   wherein the holding face has grid holes having a diameter smaller than the propellant granule, and
   wherein the holding face is entirely spaced apart from the combustion chamber cover defining an empty space.

2. A gas generator according to claim 1, wherein the holding face has a chamfered edge.

3. The gas generator according to claim 1, wherein the holding face consists of a metal fabric.

4. The gas generator according to claim 1, wherein the holding face is a perforated metal sheet.

5. The gas generator according to claim 4, wherein the perforated metal sheet is stiffened by crimped portions.

6. The gas generator according to claim 1, wherein the perforated metal sheet is provided on its edge with bulges which engage the combustion chamber wall.

* * * * *